(12) United States Patent
Trotter et al.

(10) Patent No.: US 7,699,570 B2
(45) Date of Patent: Apr. 20, 2010

(54) GROMMET CONNECTOR

(75) Inventors: Jason K. Trotter, Des Plaines, IL (US); Robert K. Dutzi, Palatine, IL (US); Dennis M. Mark, Palatine, IL (US); Jeremy M. Beck, Hartford, CT (US)

(73) Assignee: Illinois Tool Works Inc., Glenview, IL (US)

( * ) Notice: Subject to any disclaimer, the term of this patent is extended or adjusted under 35 U.S.C. 154(b) by 506 days.

(21) Appl. No.: 11/657,804

(22) Filed: Jan. 25, 2007

(65) Prior Publication Data

US 2007/0119017 A1  May 31, 2007

Related U.S. Application Data

(63) Continuation-in-part of application No. 11/484,436, filed on Jul. 11, 2006, now abandoned, which is a continuation-in-part of application No. 11/113,602, filed on Apr. 25, 2005, now abandoned, which is a continuation of application No. 10/454,184, filed on Jun. 4, 2003, now abandoned.

(60) Provisional application No. 60/386,824, filed on Jun. 7, 2002.

(51) Int. Cl.
*F16B 43/00* (2006.01)

(52) U.S. Cl. ..................................... 411/533
(58) Field of Classification Search ............... 411/533, 411/542, 999, 339, 452
See application file for complete search history.

(56) References Cited

U.S. PATENT DOCUMENTS

| | | | | |
|---|---|---|---|---|
| 3,652,903 A | * | 3/1972 | Eriksson et al. | 257/726 |
| 3,910,588 A | * | 10/1975 | Austin | 411/542 |
| 4,587,377 A | * | 5/1986 | Rodseth | 174/16.3 |
| 4,630,452 A | * | 12/1986 | Connelly et al. | 63/12 |
| 4,869,440 A | * | 9/1989 | Toral et al. | 242/347.2 |
| 5,704,631 A | * | 1/1998 | Sparks et al. | 280/124.101 |
| 6,402,171 B1 | * | 6/2002 | Nickerson et al. | 280/124.106 |
| 6,676,345 B2 | * | 1/2004 | Szczukowski et al. | 411/9 |
| 6,769,850 B2 | * | 8/2004 | Lay | 411/112 |
| 7,192,234 B2 | * | 3/2007 | Anderson et al. | 411/533 |
| 7,244,085 B2 | * | 7/2007 | Dobson et al. | 411/431 |

\* cited by examiner

*Primary Examiner*—Flemming Saether
(74) *Attorney, Agent, or Firm*—Mark W. Croll; Paul F. Donovan

(57) ABSTRACT

A grommet connector includes a first end portion and a second end portion with a barrier therebetween. The first end portion is adapted for insertion into a grommet, and the second end portion is adapted for connecting to another part, such as a nut or washer to form a subassembly of the grommet and the other part.

12 Claims, 5 Drawing Sheets

GROMMET CONNECTOR

CROSS-REFERENCE TO RELATED APPLICATIONS

This application is a continuation in part of U.S. patent application Ser. No. 11/484,436 filed on Jul. 11, 2006; now abandoned which is a continuation-in-part of U.S. patent application Ser. No. 11/113,602 filed on Apr. 25, 2005, now abandoned which was a continuation of U.S. patent application Ser. No. 10/454,184 filed on Jun. 4, 2003, now abandoned which claimed benefits to U.S. Provisional Application No. 60/386,824 filed Jun. 7, 2002.

FIELD OF THE INVENTION

The present invention relates to a connector for a grommet and another part or parts and, more particularly, the invention relates to a grommet connector useful for connecting a grommet and a nut in a subassembly.

BACKGROUND OF THE INVENTION

Suspension and steering system components in an automobile frequently have relatively complex assemblies with numerous individual parts and components. For example, U.S. Pat. No. 5,449,193 entitled "End Link For A Vehicle Stabilizer Bar" shows a relatively complex assembly of washers, numerous grommets, spacers and nuts all assembled on a connector bar. While the individual pieces are not complex or difficult to manipulate individually, the overall assembly becomes complex from the large number of individual pieces assembled. Complexity and difficulty in assembly also results from the need to assemble the numerous components not only in proper sequence, but also in the proper end-to-end orientation. These needs require the assembler to pay close attention to the order of assembly and the orientation of each part, to ensure that all components have been properly installed. Assembling the components improperly, such as by forgetting components, installing the components in a wrong sequence or installing the components in the proper sequence but in a wrong end-to-end orientation can impair the performance of the assembly. Thus, it is desirable to reduce the number of handled parts or assemblies to ensure proper assembly.

Even if all components are arranged in proper sequence, and in proper end-to-end orientation, it is difficult to align each on the bar. Slight twisting or misalignment from true axial alignment can also affect ultimate performance of the assembly from the parts not being seated properly one against another. Holding the parts, to prevent skewing of washers, grommets, nuts or other parts is difficult because of the numerous parts required in the assembly. Further, assembly is slowed as the assembler is required to obtain, orient and install a large number of separate pieces.

Various connecting devices are known, some more successful than others. It is known to use shrink-wrap to hold parts together; however, the use of shrink wrap also presents certain difficulties in assembly, which add to the expense thereof. For example, it may be necessary to use nuts and washers that are connected as a single unit, and are more expensive than individual nuts and washers.

It is known to provide washers, grommets, nuts and the like temporarily installed on other components. It then is necessary to remove the washer, grommet and nut when the final assembly and installation are completed. Installers have been known to attempt to turn the radially largest component, often the washer, when removing the grommet, nut and washer from a threaded component. Accordingly, efficiency advantages can be obtained during final installation if the entire subassembly of the grommet, nut, washer and connector are relatively secure one to another so that the entire assembly can be rotated by turning any one of the components to rotate the nut off of the complementary threaded component, when loosely connected thereto.

What is needed in the art is a device for joining grommets to one or more other adjacent components, to create one or more subassemblies, reduce the number of discrete parts requiring final assembly and to facilitate proper alignment and orientation of the parts.

SUMMARY OF THE INVENTION

The present invention provides a grommet connector that serves as an interconnecting component between a grommet and other parts, such as nuts and washers, to reduce the number of individual components in a final assembly.

In one form thereof, the present invention provides a grommet subassembly with a grommet having a grommet hole, an other part having a perimeter surface, and a grommet connector having a connector hole. The grommet connector interconnects the grommet and the other part. The grommet connector includes a first end portion and a second end portion. The first end portion has a barrel disposed in the grommet hole. The second end portion has retention arms along the perimeter surface. The retention arms are engaged with the other part and axially align the connector hole with the hole in the other part. A barrier is disposed between the first end portion and the second end portion.

In another form thereof, the present invention provides a grommet connector with a first end portion and a second end portion having a continuous connector hole therethrough. The first end portion has a barrel adapted to engage a grommet. The second end portion has retention arms adapted to engage an other part having a hole therethrough and to axially align the connector hole with the hole in the other part. A barrier is disposed between the first end portion and the second end portion.

In still another form thereof, the present invention provides a grommet connector with a barrier having a first side and a second side. A barrel extends outwardly from the first side of the barrier and is adapted to engage a hole in a grommet. The second side of the barrier is configured to overlie a portion of an other part to capture the other part in position relative to the grommet.

An advantage of the present invention is providing a connector that can join a grommet to a nut, washer, or other part to reduce the number of loose components required in a final assembly.

Another advantage of the present invention is providing a connector for a grommet and other parts, which promotes proper axial alignment of the parts connected thereby, and does not affect original design function of the parts.

Still another advantage of the present invention is providing a grommet connector that is easy to use and install, and allows for shipping of subassemblies.

A further advantage of the present invention is providing a grommet connector that improves assembly efficiency by establishing a modular construction utilizing subassemblies.

Yet another advantage of an embodiment of the present invention is providing a grommet connector that continues to perform even if partly damaged.

Other features and advantages of the invention will become apparent to those skilled in the art upon review of the following detailed description, claims and drawings in which like numerals are used to designate like features.

Figure 1:
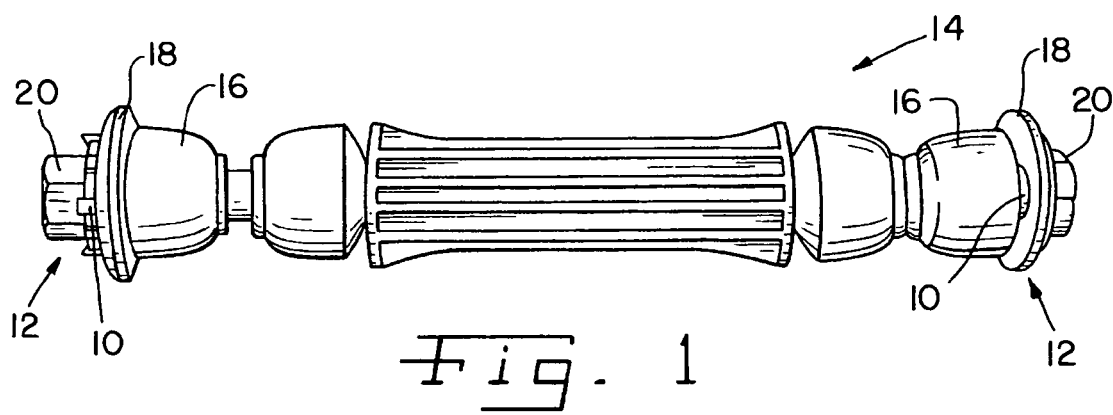
FIG. 1 is an elevational view of a link assembly having grommet connectors in accordance with the present invention.
Figure 2:
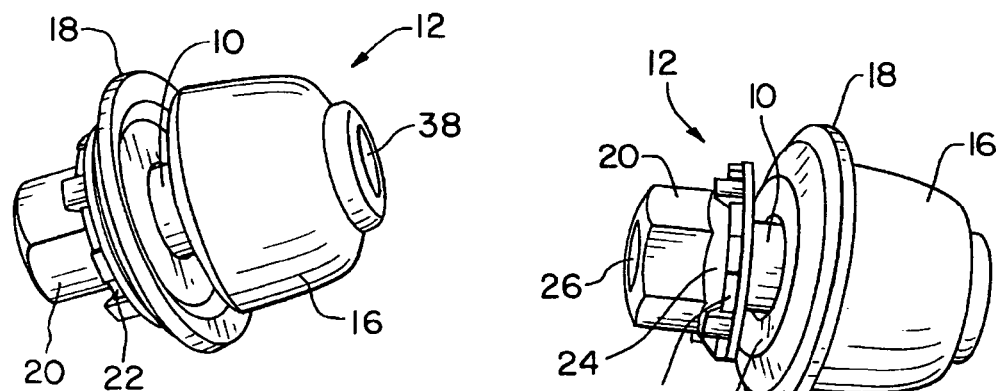
FIG. 2 is a perspective view showing primarily one end of a grommet subassembly including a nut, a washer and a grommet connected one with another by a connector of the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates grommet connectors in accordance with the present invention shown within grommet sub-assemblies 12 on opposite ends of a link assembly 14. It should be understood that grommet connectors in accordance with the present invention can be used in a variety of applications and installations. Link assembly 14 shown and described herein is merely one advantageous application and use for grommet connectors of the present invention. Grommet connectors of the present invention can be used advantageously in vehicle suspension systems of types other than that shown, and/or in other assemblies using grommets of various types for automobiles and other assemblies.

Figure 3:
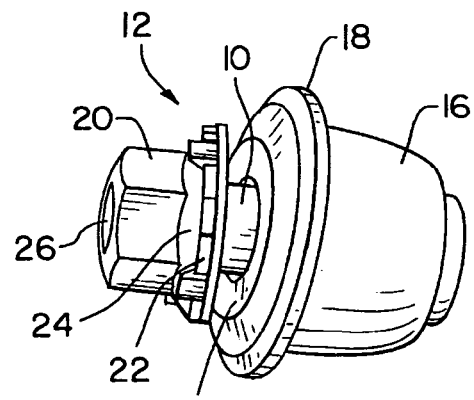
FIG. 3 is a perspective view of the subassembly shown in FIG. 2, but showing primarily the end opposite the end shown in FIG. 2.

Grommet subassemblies 12 on opposite ends of link assembly 14 are similar in structure, each having a grommet 16, a washer 18 and a nut 20 held by connector 10. In the exemplary embodiment shown, washer 18 and nut 20 are separate, discrete components. In this way, connector 10 allows conventional, simple nuts and washers to be used in place of more complex and expensive nut and washer components provided as a single connected or monolithic body. Nut 20 has a perimeter surface 22, an exposed surface 24 and a hole 26 extending therethrough (FIG. 3).

It should be understood that a grommet connector of the present invention can be used for connecting grommets to other parts of other assemblies. For example, grommet connector 10 can be used to connect a grommet to a nut without a washer. In that regard, the structure and arrangement of grommet connector 10 can be varied as necessary for connecting to the various parts to be interconnected therewith.

Figure 5:
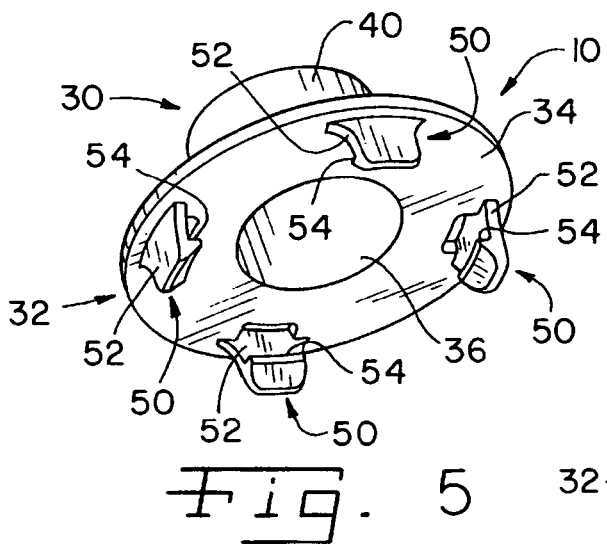
FIG. 5 is a perspective view of one end of a grommet connector of the present invention.
Figure 6:
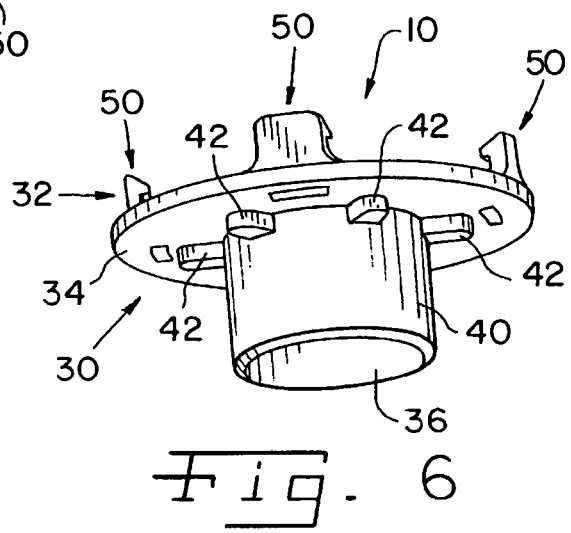
FIG. 6 is a perspective view from a side of the grommet connector shown in FIG. 5.
Figure 7:
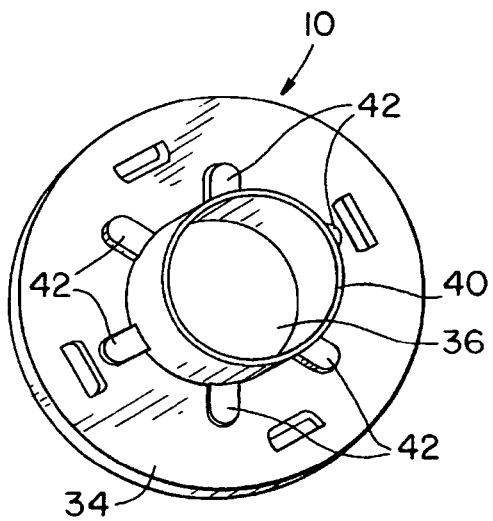
FIG. 7 is a perspective view of the grommet connector shown in FIGS. 5 and 6, showing the end opposite the end shown in FIG. 5.

Referring now to FIGS. 5-7, grommet connector 10 includes a first end portion 30 and a second end portion 32. First end portion 30 is adapted for connecting to grommet 16, and second end portion 32 is adapted for connecting to another part such as, for example, nut 20. Washer 18 is secured on connector 10 and against grommet 16. A barrier 34 separates first end portion 30 from second end portion 32 and is a continuous flange extending radially outward therefrom. Barrier 34 is of sufficient size and shape such that washer 18 is secured between barrier 34 and grommet 16. Barrier 34 can be of different shapes and sizes or even different structure relative to the components that it engages. A continuous connector hole 36 extends through first end portion 30, second end portion 32 and barrier 34.

Figure 4:
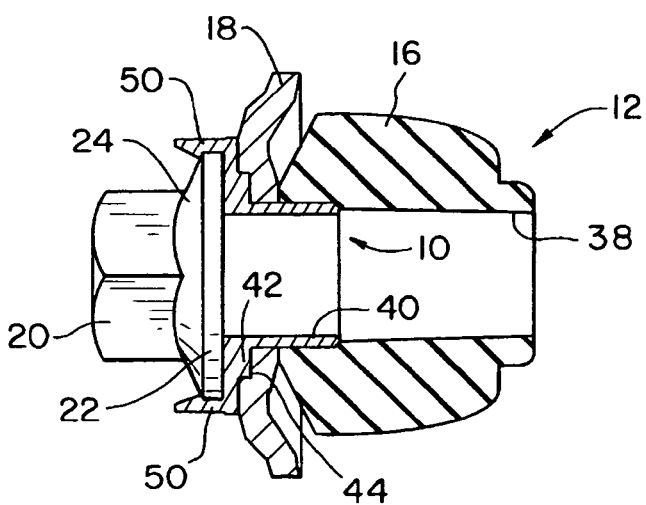
FIG. 4 is a cross-section view of the subassembly shown in FIGS. 2 and 3.

First end portion 30 is adapted for connecting grommet connector 10 to grommet 16 having a grommet hole 38 therethrough. In the exemplary embodiment shown, first end portion 30 is a barrel 40 extending outwardly from a first side of barrier 34. Barrel 40 is inserted into grommet hole 38. Barrel 40 can be of sufficient size to create a friction fit within grommet hole 38, or can otherwise establish a mechanical lock. At the juncture of barrel 40 and barrier 34 a plurality of standoff elements 42 are provided to engage washer 18. In the exemplary embodiment, six standoff elements 42 are provided in the nature of elongated ribs raised from the surface of barrier 34 and radiating outwardly from a barrel 40. However, it should be understood that more or fewer standoff elements 42 can be used, and of different shapes than the elongated ribs shown. In some uses of the present invention standoff elements may not be required. Standoff elements 42 are received in a groove 44 of washer 18 (FIGS. 3 and 4). Alternatively, a plurality of discrete pockets can be provided of a sufficient length and location to receive the individual standoff elements 42 therein. A sufficient number of standoff elements 42 are used to properly position washer 18 against barrier 34.

Second end portion 32 is adapted to align with the other part to which grommet connector 10 is attached, such as, for example, nut 20, and thereby align grommet 16 therewith. Second end portion 32 is further adapted for connecting grommet connector 10 to the other part, such as nut 20. In the exemplary embodiment shown, second end portion 32 includes a plurality of retention arms 50 extending outwardly from a second side of barrier 34, four such retention arms 50 being provided in the exemplary embodiment. Each retention arm 50 includes a pedestal 52 and an inwardly projecting lip 54 at the distal end of pedestal 52. Retention arms 50 are resilient and deflectable. Pedestals 52 are positioned on barrier 34 just outwardly of nut 20, along perimeter surface 22 to require nut 20 to be inserted forcefully past inwardly projecting lips 54. Pedestals 52 deflect outwardly slightly, allowing nut 20 to be pushed past lips 54. Pedestals 52 are of sufficient length extending away from barrier 34 so that lips 54 engage snuggly on exposed surface 24 of nut 20.

Figure 8:
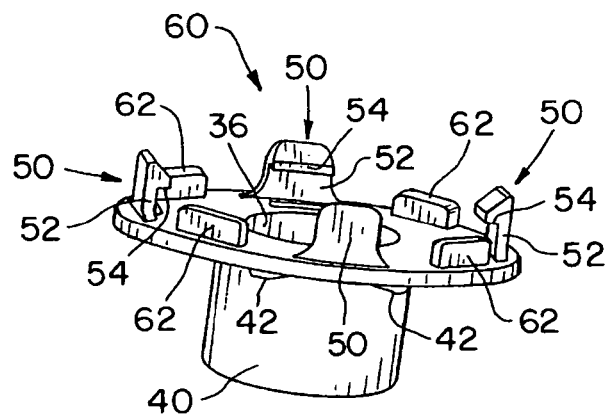
FIG. 8 is a perspective view of another embodiment of a grommet connector in accordance with the present invention.

A second embodiment of a grommet connector 60 is shown in FIG. 8. Connector 60 is similar to connector 10, and components of connector 60 are numbered similarly to the corresponding similar components of connector 10.

In the use of connector 10, fracture of a retention arm 50, or complete separation of a retention arm 50 from barrier 34 can allow nut 20 to be moved laterally, out from under the remaining lips 54. If moved in that manner, nut 20 can be dislodged from its secured in position. One solution is to provide more retention arms more closely spaced so that fracture of a retention arm 50 or complete separation of a retention arm 50 from barrier 34 still does not allow nut 20 to move laterally a sufficient distance to become dislodged. However, providing additional retention arms 50 can complicate a mold used for forming the grommet connector and the types of components that can be connected to the grommet connector.

Second embodiment 60 includes a plurality of lateral abutments 62, with one abutment 62 between each pair of adjacent retention arms 50. Lateral abutments 62 abut perimeter surface 22 of nut 20 when nut 20 is positioned on a grommet connector 60. Accordingly, if a retention arm 50 is fractured or separated, lateral abutments 62 inhibit lateral movement of nut 20, thereby minimizing the potential of nut 20 being dislodged even when a retention arm 50 is broken. Lateral abutments 62 can be made lower and stronger than retention arms 50 in that lateral abutments 62 do not engage nut 20 axially, and are not required to deflect when nut 20 is assembled with connector 60. It should be understood that while a single abutment 62 is shown in the spaces between adjacent retention arms 50, more than two abutments also can be used.

Grommet connectors of the present invention may be advantageously made of plastic. Those skilled in the art will readily understand how grommet connector 10 can be used to connect a grommet 16 to various nuts or other parts by the positioning and size of retention arms 50. Retention arms 50 can be positioned irregularly to surround the perimeter surface of irregular parts. Washers, spacers or other components of various sizes can be positioned and assembled between barrier 34 and grommet 16 or between barrier 34 and the other part, such as nut 20 by the use of appropriate standoff elements. In this manner, two, three or more individual parts can be preassembled in proper order and axially aligned as a subassembly for efficient final assembly on an assembly, such as link assembly 14. The properly assembled and aligned parts of the subassembly simplify the use of washers and other parts to extend durability and performance of the final assembly.

Figure 9:
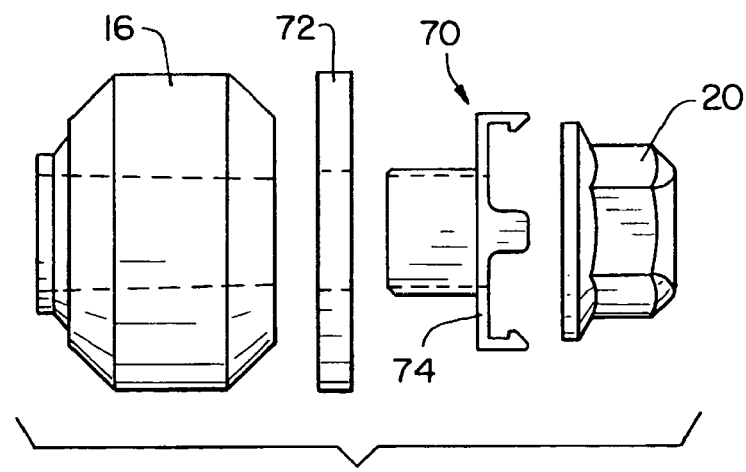
FIG. 9 is an exploded view of a grommet, washer and nut assembly having a connector according to another embodiment of the present invention.
Figure 10:
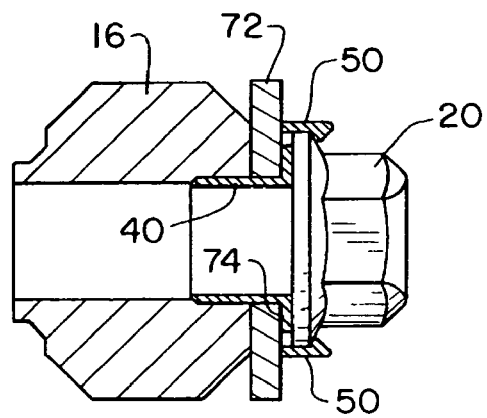
FIG. 10 is a cross-sectional view of the embodiment of FIG. 9, but illustrated in assembled condition.

FIGS. 9 and 10 illustrate yet another embodiment of the present invention. Third embodiment connector 70 joins grommet 16, nut 20 and a flat washer 72. Standoff elements are not required so that a barrier 74 of connector 70 is substantially flat on both faces thereof.

Figure 11:
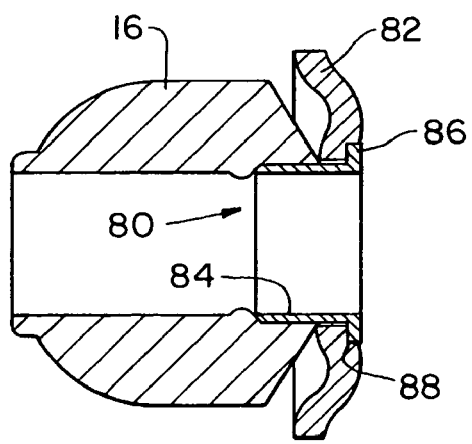
FIG. 11 is a cross-sectional view of yet another embodiment of the present invention.

FIG. 11 illustrates a connector 80 connecting a cupped washer 82 and grommet 16. Connector 80 includes a barrel 84 at a first end thereof, and a flange 86 at a second end thereof. Flange 86 is received in a channel 88 formed in a surface of cupped washer 82. Flange 86 overlies a bottom portion of channel 88, thereby holding washer 82 in position relative to grommet 16.

Figure 12:
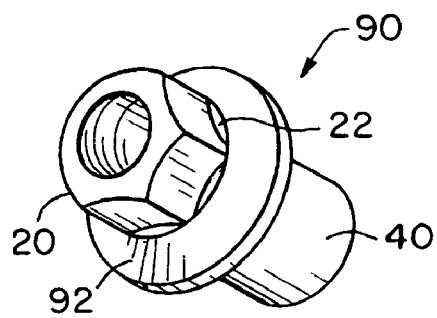
FIG. 12 is a perspective view of an assembly having a connector in accordance with yet another embodiment of the present invention.
Figure 13:
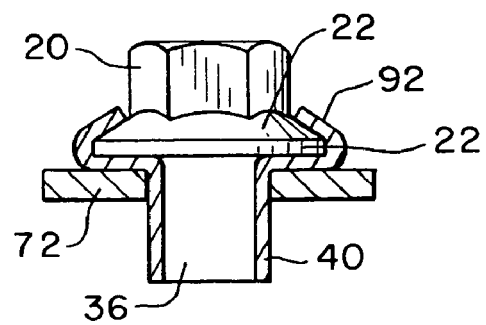
FIG. 13 is a cross-sectional view of the assembly shown in FIG. 12.

FIGS. 12 and 13 illustrate yet another connector 90 having a sleeve 92 formed of a soft yieldable or stretchable material, such as a soft plastic. Sleeve 92 stretches around perimeter surface 22 and overlies at least a portion of exposed surface 22 therein.

Figure 15:
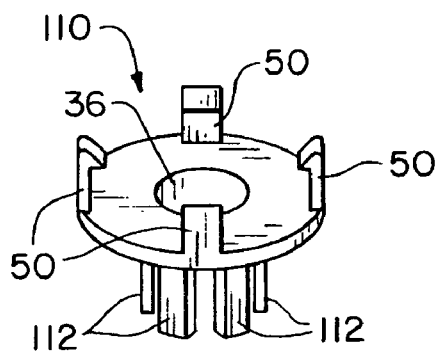
FIG. 15 is a perspective view of still another embodiment of the present invention.
Figure 14:
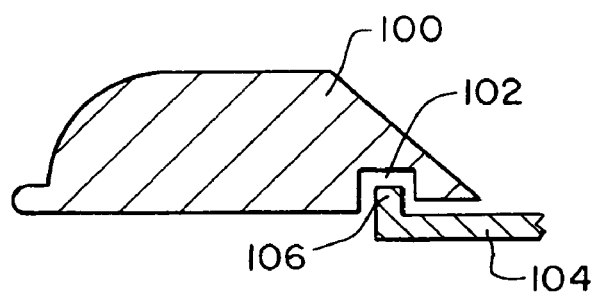
FIG. 14 is a fragmentary cross-sectional view of yet another embodiment of the present invention.

Still other variations and modifications can be made, without departing from the scope of the present invention. For example, instead of, or in addition to a friction fit of barrel 40 and grommet 16, a mechanical interlock can be established. FIG. 14 illustrates a grommet 100 having a channel 102. A connector barrel 104 includes a rim 106 received in channel 102 to mechanically interlock structure 104 to grommet 100. Further, while shown as a substantially continuous cylinder in the previous embodiments, the barrel can be discontinuous circumferentially, and defined by a plurality of spaced barrel segments. Connector 110 shown in FIG. 15 includes a plurality of barrel segments 112 defining a barrel used similarly to those described previously herein. It should be understood also that various features can be combined. For example, barrel segments 112 can be provided with outwardly extending rims similar to rim 106 such that barrel segments 112 can interlock mechanically with grommet 100.

Figure 16:
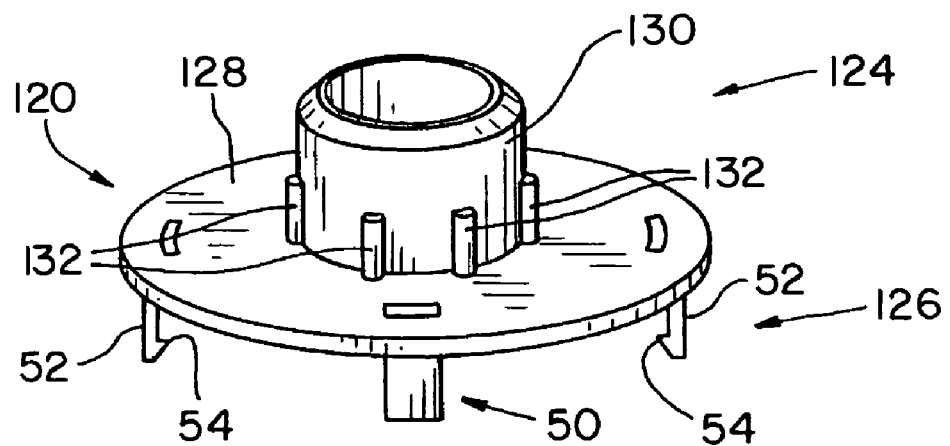
FIG. 16 is a perspective view of yet another embodiment of the present invention.
Figure 17:
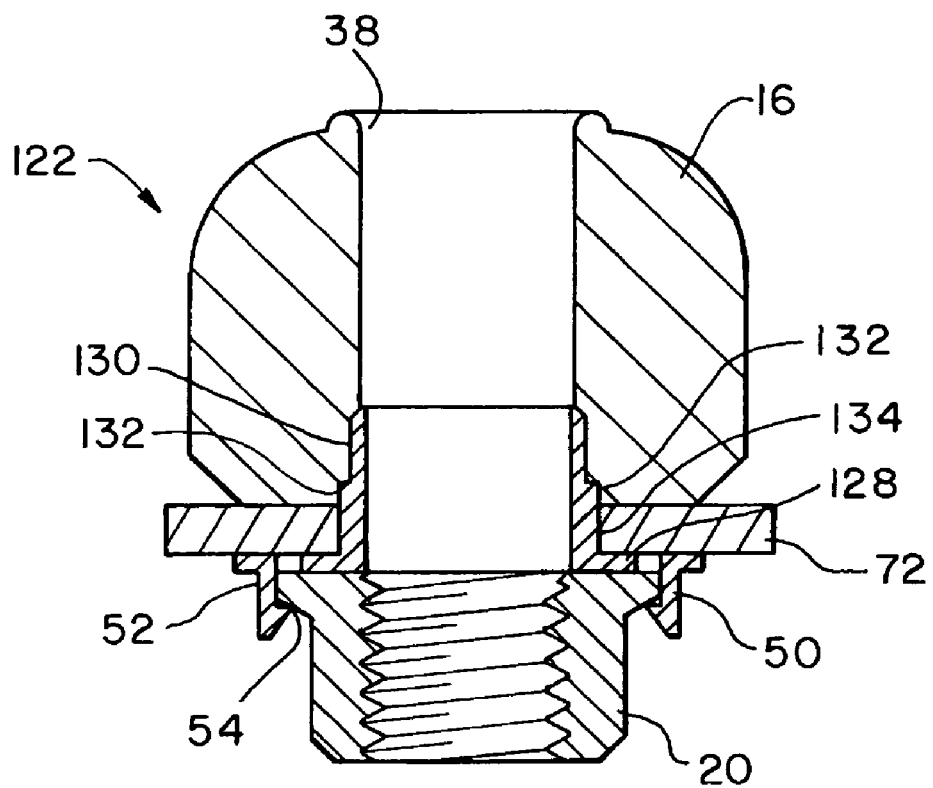
FIG. 17 is a cross-sectional view of an assembly including a nut, a washer and a grommet secured by the connector illustrated in FIG. 16.

FIGS. 16 and 17 illustrate yet another embodiment for a connector 120 of the present invention, similar to connector 70 shown and described previously here in. Connector 120 joins grommet 16, nut 20 and a flat washer 72 to form a grommet subassembly 122. Connector 120 includes a grommet and washer connecting first end portion 124 and a nut connecting second end portion 126 separated by a barrier 128. Barrier 128 is a radial flange extending outwardly and having first and second sides toward first and second end portions 124, 126, respectively.

Grommet and washer connecting first end portion 124 includes a barrel 130 projecting outwardly from barrier 128. Barrel 130 is adapted for insertion into grommet hole 38 of grommet 16, whereby grommet 16 is securely held on structure 130. Connector 120 includes a plurality of surface ribs 132 extending on the outer surface of barrel 130 some distance from barrier 128. Surface ribs 132 define an outer diameter slightly greater than the diameter of a hole 134 in washer 72. Accordingly, as washer 72 is placed onto connector 120, surface ribs 132 deform or crush slightly, creating a secure interference fit between washer 72 and connector 120, even with slight variations in the diameter of washer hole 134. In the exemplary embodiment shown, surface ribs 132 are axially oriented, elongated protrusions from the surface of barrel 130. However, it should be understood that other shapes and orientations for surface ribs 132 can be used to establish a satisfactory interference fit of washer 72 on barrel 130. For example, surface ribs 132 can be angularly oriented and can be longer or shorter.

Nut connecting second end portion 126 includes a plurality of retention arms 50, as shown and described previously herein, each retention arm 50 including a pedestal 52 and an inwardly projecting lip 54 at the distal end of pedestal 52. Retention arms 50 secure nut 20 as described previously herein.

With washer 72 engaged by interference fit on surface ribs 132, if washer 72 is rotated, connector 120 will also rotate, absent excessive resistance, and as connector 120 rotates grommet 16 and nut 20 also will rotate there with. Accordingly, if sub-assembly 122 including connector 120 grommet 16, washer 72 and nut 20 is pre-installed on a thread component, such as, for example link assembly 14, in somewhat loose fashion, sub-assembly 122 can be removed by rotating any one of grommet 16, washer 72 or nut 20, at the installer's convenience. When reinstalling sub-assembly 122, initial installation can be accomplished by rotating any one of grommet 16, washer 72 or nut 20, with final tightening made by turning nut 20.

The use of surface ribs 132 to establish an interference fit of washer 72 on a grommet connector of the present invention can be used in combination with other of the various embodiments shown herein. For example, those skilled in the art will readily understand that lateral abutments 62 can be used between retention arms 50 and/or standoff elements 42 can be used with a washer 18 engaged on surface ribs 132. Still further, surface ribs 132 can be used in combination with the various other embodiments disclosed herein and the equivalents thereof, such as, for example and not limitation, the use of flange 86 with a cupped washer 82 having a channel 88, the use of a sleeve 92 for holding nut 20 instead of retention arms 50, the use of a barrel 104 having a rim 106 and/or the use of barrel segments 112 some or all of which may include a surface rib 132 thereon.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art. Various features of the invention are set forth in the following claims.

What is claimed is:

1. A grommet subassembly comprising:
   a grommet having a grommet hole;
   an other part having a perimeter surface and an other hole;
   a grommet connector having a connector hole, said grommet connector interconnecting said grommet and said other part, said grommet connector including:
   a first end portion and a second end portion;
   said first end portion having a barrel disposed in said grommet hole, and at least one surface rib extending along on outer surface of said barrel;
   said second end portion having retention arms along said perimeter surface, said retention arms being engaged with said other part and axially aligning said connector hole with said other hole in said other part; and
   a barrier disposed between said first end portion and said second end portion, said barrier comprising a radially extending flange; and
   a washer between said barrier and said grommet, said washer being disposed on said at least one surface rib and being secured thereon by interference fit.

2. The grommet subassembly of claim 1, including lateral abutments on a surface of said barrier between adjacent said retention arms.

3. The grommet subassembly of claim 2, including at least one standoff element on a surface of said barrier facing said first end portion.

4. The grommet subassembly of claim 3, including a plurality of said standoff elements on said barrier extending radially from said barrel.

5. The grommet subassembly of claim 3, said at least one standoff element being an elongated rib.

6. The grommet subassembly of claim 5, said other part being a nut.

7. The grommet subassembly of claim 5, each said retention arm having a pedestal projecting outwardly from said barrier and a lip overlying an exposed surface of said other part.

8. The grommet subassembly of claim 7, said other part being a nut.

9. The grommet subassembly of claim 1, including at least one standoff element on a surface of said barrier facing said first end portion.

10. The grommet subassembly of claim 9, including a plurality of said standoff elements on a surface of said barrier and extending radially from said barrel.

11. The grommet subassembly of claim 10, including a washer between said barrier and said grommet, and said washer having a recessed area for receiving said standoff elements.

12. The grommet subassembly of claim 1, each said retention arm having a pedestal projecting outwardly from said barrier and a lip overlying an exposed surface of said other part.

* * * * *